United States Patent [19]

Feller

[11] 4,399,696
[45] Aug. 23, 1983

[54] FLOW SENSOR PROBES

[75] Inventor: Murray F. Feller, Citrus County, Fla.

[73] Assignee: Wilgood Corporation, Dunnellon, Fla.

[21] Appl. No.: 215,524

[22] Filed: Dec. 11, 1980

Related U.S. Application Data

[63] Continuation-in-part of Ser. No. 31,416, Apr. 19, 1979, abandoned, and a continuation-in-part of Ser. No. 150,142, Jun. 18, 1980, Pat. No. 4,333,354.

[51] Int. Cl.³ .......................... G01F 1/10; G01F 1/64
[52] U.S. Cl. ................................... 73/195; 73/861.77; 73/861.92
[58] Field of Search ................ 73/195, 861.77, 861.79, 73/861.89, 861.92

[56] References Cited

U.S. PATENT DOCUMENTS

| | | | |
|---|---|---|---|
| 2,859,616 | 11/1958 | Fellows | 73/195 |
| 2,878,672 | 3/1959 | Wikkenhauser | 73/189 |
| 3,979,954 | 9/1976 | Ide et al. | 73/861.24 |
| 4,111,043 | 9/1978 | Guthrie et al. | 73/861.79 X |

Primary Examiner—Herbert Goldstein

[57] ABSTRACT

The disclosed flow sensors involve rotor-bearing probes proportioned for entry through a hole in a pipe. By omitting flow-straightening vanes, the rotors can be relatively large. Multiple rotors distributed across the flow passage, especially one or more pairs of oppositely rotating rotors, have respective rotation sensors whose outputs are combined for averaging out the varied effects of the flow on the rotors. The rotation sensors produce trains of pulses that are converted to narrow spikes before being combined.

18 Claims, 8 Drawing Figures

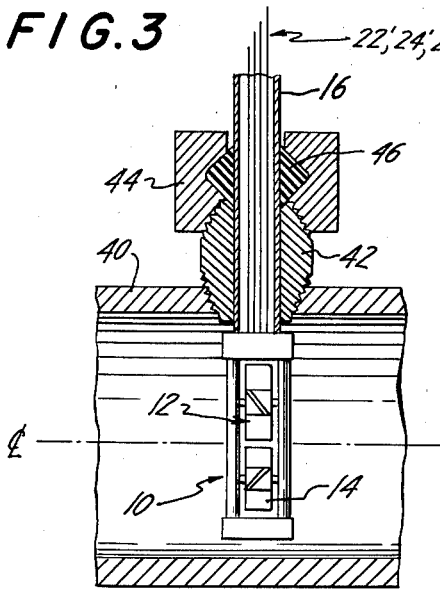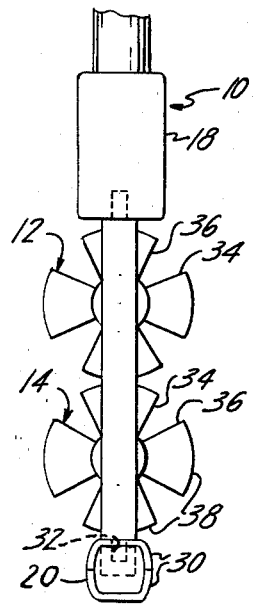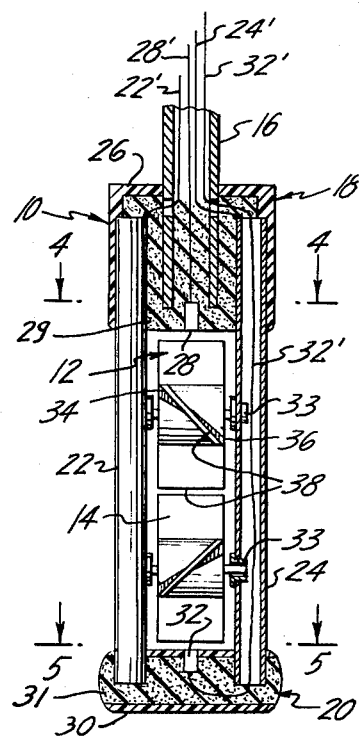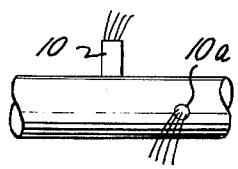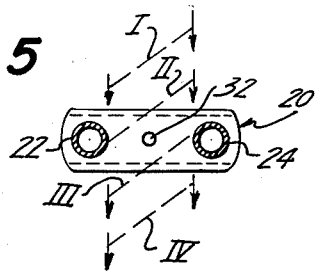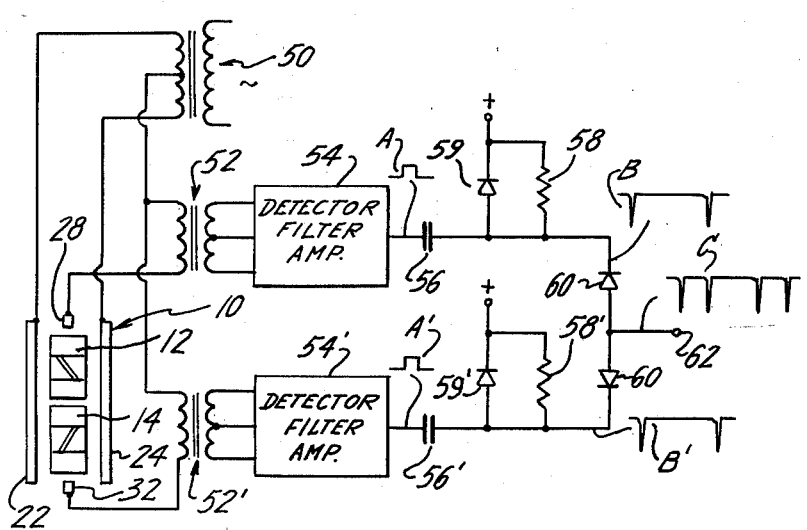

FLOW SENSOR PROBES

This is a continuation-in-part of my application Ser. No. 31,416 filed Apr. 19, 1979, now abandoned, and of my application Ser. No. 150,142 filed June 18, 1980, now U.S. Pat. No. 4,333,354 issued June 8, 1982.

BACKGROUND OF THE INVENTION

A common type of flow sensor involves a bladed rotor of either the turbine type or the "paddle-wheel" type driven by the fluid such as water. The flow sensor is usually made as a unit, including a short length of pipe containing a rotor that is at the axis of the pipe, and a rotation sensing device is positioned close to the path of the rotor blades. One consideration limiting the use of flow sensors of that kind is that installed pipe must be cut in order to insert the flow sensor.

It has been found simpler to install a flow sensor of the probe type, having a rotor-and-sensor bearing tube inserted through a hole in the wall of the pipe. A technique is even available enabling the installation to be performed while the pipe carries liquid under pressure. Flow sensors of the probe type are also advantageous where the pipe diameter is large and where a standardized probe is to be used with various pipe diameters.

Similar considerations apply to flow sensors for air, and where the fluid conduit is round or rectangular duct rather than cylindrical pipe.

Rotor-type flow-sensing probes commonly use flow-straighteners to minimize error that would result from anomalies occurring in the flow such as a spiral spin of the fluid. However, if flow-straighteners are added to the rotor of a probe, the result would be an oversize probe, or one in which the size of the rotor is drastically reduced, for the probe to enter a normal-sized hole in a pipe. Miniaturized rotors have related problems of high cost, short life and impaired accuracy.

SUMMARY OF THE INVENTION

An object of the invention resides in providing a novel flow sensor involving a rotor-bearing probe, avoiding or ameliorating the foregoing and other problems.

The flow sensor as disclosed in detail below includes multiple probe-mounted rotors disposed at different positions in the cross-section of the flow passage. Each rotor operates freely, unconstrained by the other(s) or by the means that monitors rotations of the rotors. Varying influences on the rotors due to local flow anomalies are balanced, to a close approximation, by combining and thus averaging the outputs of rotation sensors of all of the rotors. Distinctively, one or more pairs of turbine-type rotors are displaced equally from the pipe axis, especially in symmetry, and the rotors of each pair rotate in opposite directions to nullify largely any spiral-spin of the flow. These features separately and together make it feasible to omit flow-straighteners and to utilize rotors whose size is limited primarily by the size of the hole in the pipe that is to admit the probe.

Where multiple sensors are used with the plural rotors as will normally occur, the output pulses of the sensors could be counted separately and the counts could then be combined. However it is a distinct advantage to combine the pulse trains from plural sensors in a common output channel. A novel feature of the invention resides in converting such pulses to spikes so that there is only a minimal probability of a spike from one sensor masking and thus nullifying a spike from another sensor in the common output channel.

In the illustrative embodiments of the invention detailed below, each of the flow-sensing rotors has a form of impedance rotation sensor. Electrodes are provided whose coupling in the flow passage, especially by conduction through water or the like, is modulated by the rotor's blades. Various forms of rotor-influenced sensors can be adopted for present purposes, which provide pulses responsive to rotation of the rotor. However, impedance sensors are well suited to developing trains of spikes that are here combined without serious concern for masking of pulses, as considered above.

The nature of the invention, including the foregoing and other objects, advantages and novel features, will be better understood and appreciated from the following detailed description of an illustrative embodiment and a modification, and from the drawings which form part of the illustrative disclosure.

IN THE DRAWINGS:

FIG. 1 is an elevation, partly in cross-section, of a novel flow-sensing probe embodying features of the invention;

FIG. 2 is a side elevation of the novel probe as viewed from the left of FIG. 1;

FIG. 3 illustrates the probe of FIG. 1 installed in a pipe, portions being shown in cross-section;

FIG. 3A is a lateral view of a pipe having two probes, each formed as in FIGS. 1–5.

Figure 7:
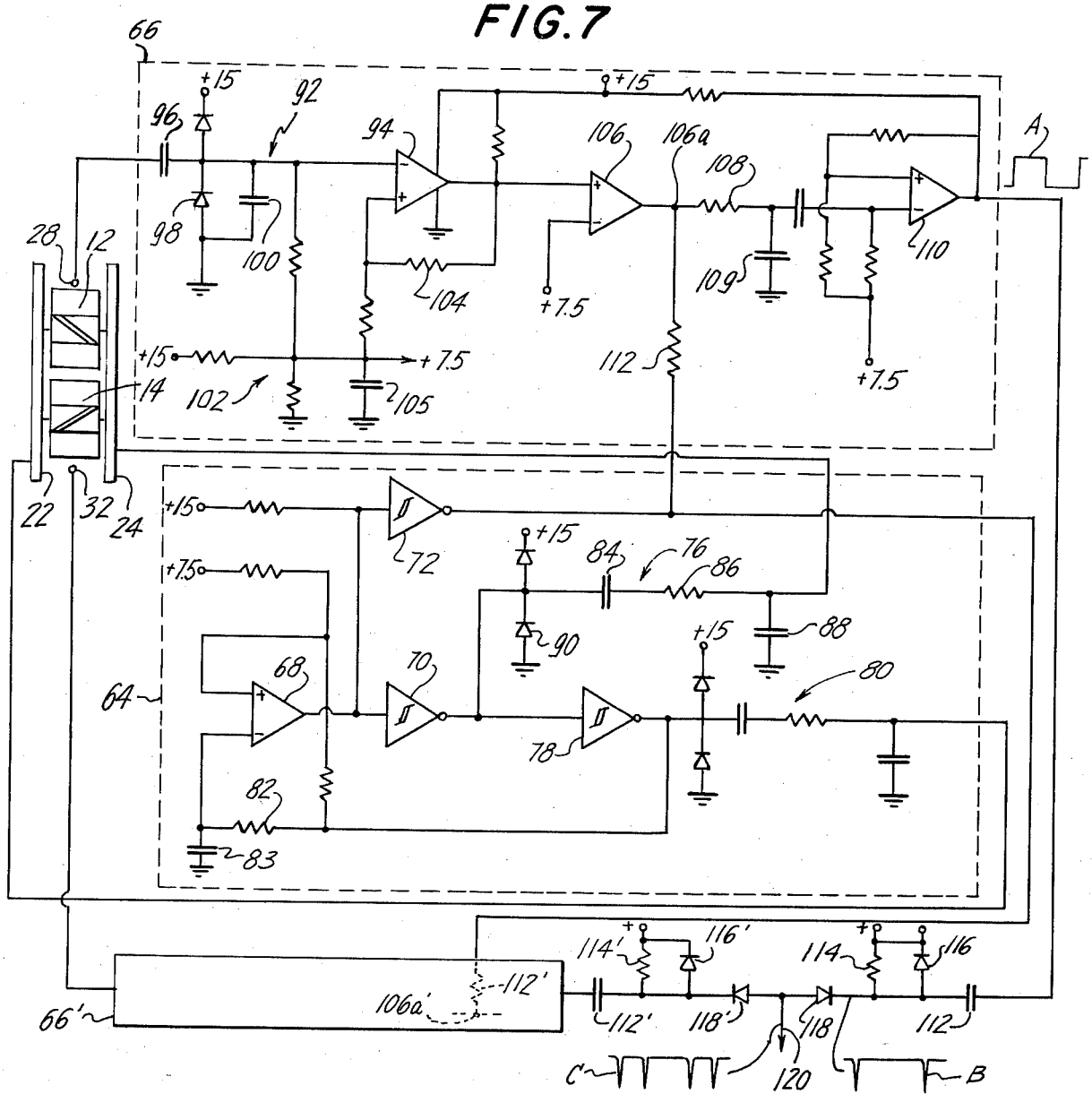

FIGS. 4 and 5 are cross-sections of the novel probe when viewed from the planes 4—4 and 5—5 of FIG. 1;

FIG. 6 is a diagram of the probe of FIGS. 1–5 and a circuit for deriving a pulse train that represents flow of fluid; and FIG. 7 is a diagram of the probe of FIGS. 1–5 and circuit shown in detail for deriving a train of pulses, being a modification of that in FIG. 6.

In FIGS. 1, 2, 4 and 5, probe 10 has two rotors 12 and 14, and includes a mounting structure consisting of supporting tube 16, a top support 18 and a bottom support 20, and tubes 22 and 24 that act with supports 18 and 20 as a frame for supporting the rotors.

Top support 18 comprises an inverted cup 26 formed of molded plastic providing partial sockets for tubes 22 and 24. Tube 16 extends into inverted cup 26 through the end wall of the cup. A sensing electrode 28 has its lower end exposed and is close to rotor 12. A mass of rigid potting material 29, such as epoxy resin fills the cup. The potting material provides electrical insulation, it unifies tube 16, tubes 22 and 24 and electrode 28, and it is largely immune to deterioration when exposed to the fluid in the pipe which is considered to be tap water in this discussion.

Lower support 20 is conveniently formed of two channels of plastic 30 (FIG. 2) with their edges in abutment, forming a cavity. Tubes 22 and 24 extend through the upper channel and are locked in a mass of rigid potting material 31 such as epoxy resin that fills the channels. Electrode 32 is also locked in the potting material and has its upper end exposed and close to rotor 14.

As will be seen, tubes 22 and 24 serve a structural role but they also constitute excitation electrodes. An insulated wire 32' extends from sensing electrode 32 through the hollow of one of the tubes, and out through cup 18, a hole in tube 16, thence upward and out of tube 16. Insulated wires 22' and 24' are connected to tubes 22 and 24 and they extend through holes in tube 16 to emerge from the upper end of the probe. Insulated wire 28' is connected to electrode 28 and extends out of the probe via tube 16. Electrodes 22, 24, 28 and 32 should be made of conductive material immune to attack by the fluid, such as brass or stainless steel where the sensed fluid is tap water.

Each of the rotors 12 and 14 has a shaft (not shown) extending into suitable bearings 33 in tubes 22 and 24. Making these bearings of graphite including sapphire thrust bearings promotes nearly friction-free rotation and long life. The blades or vanes of the rotor extend from a hub. They may be spiral-shaped and their leading and trailing edges are thinned, being in many respects like true turbine blades. Between the thinned extremities 34, 36, the blades may have appreciable thickness and the longitudinal edges may have distinct width, for example 0.025 inch for a rotor of 0.800 inch diameter with a hub of 0.200 inch diameter and 0.45 inch long. These edges sweep opposite electrodes 28 and 32, for example 0.125 inch diameter, with a clearance of 0.040 to 0.050 inch from the path of the rotor-blade edges. Electrodes 22 and 24 in an example are ⅛-inch (outer diameter) tubes with the tube axes spaced 0.67 inch apart.

In this connection, further dimensions may be of interest. The diameter of the hole in the wall of the pipe through which the probe of the above example is to be inserted may be 0.9 inch. A probe-carried four-blade rotor with its diameter of 0.80 inch and 0.45 inch length can be inserted in the 0.9-inch hole if necessary by positioning the rotor blades at 45° to the length of the probe. The vanes or blades of the two rotors form spirals of mutually opposite sense or, more simply, they slope oppositely in relation to the fluid path, causing opposite directions of rotation. The outermost edge of a blade may slant 30° to a plane containing the rotor axis and intersecting the outermost edge of the blade.

As seen in FIG. 3, rotors 12 and 14 when optimally installed are disposed symmetrically at opposite sides of the centerline C/L of pipe 40 whose cross-section is a circle. A hollow plug or stub 42 has pipe thread that serves as a closure, sealing the probe-mounting hole in the wall of pipe 40. Tube 16 extends into the pipe, through stub 42 and to an external clearance position where wires 22', 24', 28' and 32' are accessible. Clamp 44 that threads onto stub 42 tightens gasket 46 against tube 16 to form a water-tight seal.

It is evident that the maximum dimension of the cross-section of the probe is limited at all parts of the length of the probe. That maximum dimension is limited by the diameter of the hole through which the probe enters the pipe. Accurate, reliable operation of a rotor depends on making the rotor large, yet it must be small enough to enter the hole in the pipe. The rotor would become tiny if the probe were to include significant flow-straightening vane at the leading and trailing ends of the rotor, were such vanes long enough to preclude serious error due to anomalies in the flow of the water. Here, accuracy is achieved and yet flow-straighteners are omitted, by using multiple rotors and combining their outputs. The output pulses from the rotor sensors can be converted into analog signals and added, or the pulse trains may be counted separately and added, or (see below) the pulse trains can be combined and counted.

There is a possibility that the fluid flow in a pipe may have a "spin" or twisting component as it flows along the pipe. Error resulting from such anomalies in the flow are reduced to minimal levels without resort to flow-staighteners by the described pair of rotors which are equally displaced from the pipe axis, preferably in symmetry at opposite sides of the pipe axis, and which rotate in opposite directions.

It would be feasible to locate rotors at different distances from the pipe axis, and to use more than two rotors on a probe or more than one pair of counter-rotating rotors where large pipe diameters are involved. When that is done, it may be desirable to "weight" the outputs of different rotors having axes at different distances from the center of the pipe. The outputs may be converted into analog signals and those signals may be "weighted" electrically, utilizing different proportions of the outputs in relation to their various distances from the pipe axis, recognizing usual variations in flow velocity at different distances from the pipe axis. Where symmetrical pairs of rotors are used, especially counter-rotating pairs, weighting may prove an unnecessary refinement.

A further arrangement for greater assurance of avoiding errors in performance of pre-calibrated probes is illustrated in FIG. 3A. Two probes 10 and 10a, each formed as in FIGS. 1–5, are installed at different points along the flow path, and at right angles to each other. The outputs of the sensors of all four rotors (two rotors of each probe) are to be combined.

FIG. 6 shows probe 10 with its electrodes 22, 24, 28 and 32 and a circuit for deriving signals representing the operation of rotors 12 and 14. Alternating current input to excitation transformer 50 applies opposite-phased signals to energizing electrodes 22 and 24. The frequency is far higher than the frequency of vanes of a rotor passing its rotation sensor at maximum flow rate. Output transformer 52 has one primary-winding terminal connected to the centertap of the secondary winding of transformer 50 and its other primary-winding terminal is connected to sensing electrode 28. The output of transformer 52 drives detector, filter and amplifier unit 54, yielding signal A. The level of signal that develops is "high" when electrode 28 is conductively coupled through the liquid more closely to electrode 22 (for example) than to electrode 24, and a "low" signal level develops when the relative couplings reverse. Transformer 52' and detector 54' function in the same way for electrodes 22, 24 and 32. The coupling changes as a turbine blade of the rotor sweeps between electrodes 22 and 24 past electrode 28 or 32.

In FIG. 5 a representative turbine blade is represented by broken lines, in four successive positions I, II, III and IV that are assumed during continued operation of rotor 32. The water represents a volume through which current flows due to excitation of electrodes 22 and 24. The turbine blade is of polysulfone or polypropylene or special grades of nylon or other insulation whose resistivity is higher than that of tap water. The nylon resistivity is from $10^{11}$ to $10^{14}$ ohm-centimeters, and the other materials have still higher resistivities. The rotor blade in positions I and IV has little effect on the electrodes. (The successive blades of the rotor passing the electrodes cause repetitions of the operation described for this blade, presuming wide separation of the blades, 90° in this embodiment.) In position II, the blade acts as a barrier in the distributed current paths through the water between electrodes 22 and 32, at which time the coupling between electrodes 24 and 32 is at a maximum. The reverse couplings prevail when the blade is at position III. High gain in unit 54', detection, and wave-shaping of the demodulated signal cause the output signal to change abruptly during the movement of a blade past electrode 32. This causes square-wave A' to develop as a blade sweeps from position I to position IV. The same square-wave signal recurs for each successive blade that passes electrode 32.

Square waves A and A' are converted to spikes B and B' by differentiating R-C circuits 56, 58 and 56', 58' which has an extremely short time constant. Diodes 59, 59' eliminate positive-going spikes that result from differentiation of square waves. Trains of negative-going spikes B and B' of extremely short duration develop as successive rotor blades sweep past sensing electrodes 28 and 32. Those trains of spikes are combined via "OR" diodes 60 and 60', to appear as signal C at output terminal 62. The signal C may be supplied to a counter to measure volume of flow, or to a flow-rate measurement device, or to a thermal-unit computer that has both flow-measurement and temperature-difference inputs. Thus, flow signal C may be used in all the usual ways.

In a broad sense, the square-wave signals A and A' derived as above could be derived from a wide variety of other rotation sensors such as magnetic pick-ups where the rotors bear magnets or ferromagnetic elements. However, the present electrodes with a phase detection circuit is simple, compact, durable, and it has many other advantages.

Practical details of a circuit similar to FIG. 6 are shown in FIG. 7.

A square-wave oscillator 64 provides square-wave excitation for energizing electrodes 22 and 24, at 2.5 to 40 kHz, for example. It also provides a reference signal for each of the two identical detectors 66, 66' whose inputs are connected to sensing electrodes 28 and 32.

Oscillator 64 has a high-gain open-collector comparator 68 connected to two identical inverting Schmitt triggers 70 and 72. The square-wave output of trigger 70 is connected via protective circuit 76 to electrode 24. The output of trigger 70 also drives an identical inverting Schmitt trigger 78 whose square-wave output is connected via a circuit 80 (the duplicate of circuit 76) to electrode 22. A feed-back path including series resistor 82 and shunt capacitor 83 extends from the output of trigger 78 to the (−) input of comparator 68, for developing square-wave oscillation. Protective circuit 76 includes a series capacitor 84, a series resistor 86 and a shunt capacitor 88 which are, for example, 0.01 Mf, 1.0kohms, and 220 pf, and diodes 90. This circuit 76 provides protection for the solid-state devices of the circuit against damage due to external pulses.

Detector 66 includes an input protective circuit 92 that couples electrode 28 to the + terminal of comparator 94. Circuit 92 here includes coupling capacitor 96 that blocks D.C. and spurious low frequencies, diodes 98 that bypass high spikes, and small capacitor 100 that bypasses spurious high frequencies. Comparator 94 has an open collector, so that it tends to switch abruptly between low and high output levels. Resistor 104 provides positive feed-back, providing hysteresis to ensure positive switching and to suppress oscillation. Bias network 102 provides bias for the (+) and (−) inputs. The bias network also provides "+7.5" volts for other parts of the circuit, filtered by by-pass capacitor 105.

The output of comparator 94 drives comparator 106, at times providing a signal of oscillator frequency to series resistor 108 and shunt capacitor 109, an integrating detector circuit. Schmitt trigger 72 provides a reference square wave to the open collector of comparator 106, through load resistor 112. Whenever the outputs of trigger 72 and comparator 106 are both instantaneously "high", the output point 106a is high. With this assumed phase relationship, output point 106a is switched high and low at oscillator frequency. This in-phase switching of comparator 106 and trigger 72 occurs when the signal of one energizing electrode, 24 for example, predominates at sensing electrode 28 over the oppositely phased oscillator signal at the other energized electrode 22. As rotor 12 turns, a blade causes the input from electrode 22 to predominate at sensing electrode 28. That causes the oscillator-frequency condition of the open collector of comparator 106 to be out-of-phase with Schmitt trigger 72. In that condition, the potential at point 106a is low when the Schmitt trigger is low, and the potential of point 106a remains low when the collector of comparator 106 is "low" even though Schmitt trigger 72 could support a "high" output at the open collector of comparator 106. Recapitulating, when the signal from one energized electrode (24) at electrode 28 predominates over the signal from the other energized electrode (22) due to the position of a rotor blade, a signal of oscillator frequency appears at point 106a and it disappears when the rotor blade reverses the predominant oscillator signal at electrode 28. Integrating detector circuit 108, 109 converts the on-off signals of oscillator frequency at point 106a to square waves, one for each blade passing electrode 28.

The square waves coupled to comparator 110 appears at the output of detector 66 as sharpened square waves. They are applied to a differentiating circuit comprising series capacitor 112 and shunt resistor 114. Diode 116 eliminates pulses of one polarity that result from differentiating the train of square waves from detector 66, leaving a train of sharp spikes that represents rotor blades passing sensing electrode 28. Detector 66' responds in like fashion to signals from sensing electrode 32, producing square-wave output that is converted in network 112', 114' and 116' into a train of sharp spikes. The two trains of spikes are coupled by "OR" gate diodes 118, 118' to combined output line 120. This signal C represents the operation of both rotors/sensors 12/28 and 14/32.

There is a possibility that two spikes derived from different detectors 66, 66' could appear as one at output line 120, each masking the other. Any such possibility is reduced to a very low order by designing the differentiator 112/114 to make the spikes of the two trains sharp and of extremely short duration as contrasted to the time interval between successive spikes of either train even at the upper limit of the flow rates being monitored.

The signals from output lines 62 and 120 in FIGS. 5 and 6 are supplied to utilization means (not shown), providing a measure of the volume of flow, or the output signals of the rotation sensors as variously processed can be used in a rate-of-flow measurement circuit, or those signals can be used as a factor to be multiplied with a temperature-difference signal in measuring heat units delivered to a room or other heat-utilization unit.

While the foregoing represents the presently preferred embodiment of the invention in its various aspects, it is evident that variations and modifications as well as other applications of the novel features may be devised by those of ordinary skill in the art. Consequently, the invention should be construed broadly, in accordance with its true spirit and scope.

What is claimed is:

1. A flow sensor, including a conduit, at least one pair of independently rotatable multiple-blade rotors mounted in the conduit for independent rotation about parallel axes displaced equally from the axis of the conduit, the blades of any pair of rotors being arranged to cause mutually opposite directions of flow-activated rotation of the rotors about the axes thereof, and rotation sensors adjacent said rotors, respectively.

2. A flow sensor as in claim 1, wherein each of said rotors is of the type whose axis is disposed along the flow path, said flow sensor being at least largely free of flow-straightening means for said rotors.

3. A flow sensor as in claim 2 wherein the axes of said pair of rotors are displaced symmetrically from the axis of the conduit.

4. A flow sensor as in claim 1, wherein said one pair of rotors forms part of a probe that includes a support for the rotors and the rotation sensors thereof, and means for mounting the probe as a closure for the hole in the wall of the conduit, the rotors being small enough to be inserted into the conduit through said hole yet so large as to exclude significant flow-straightening means from the probe.

5. A flow sensor as in claim 1, wherein said rotors have elements that sweep past said rotation sensors, respectively, to produce a train of pulses for each of said rotors and means for combining said trains of pulses.

6. A flow sensor as in claim 1 wherein said rotors have elements that sweep past said rotation sensors, respectively, to produce a train of pulses for each of said rotors, means for combining said trains of pulses, and means interposed between the rotation sensor of each said rotor and said combining means for sharply reducing the duration of the pulses from the sensor of each said rotor.

7. A flow sensor as in claim 1 wherein the conduit has a hole in the wall thereof through which a said rotor is admitted into the conduit, further including mounting means for each said rotor including a closure for said hole, each said rotor at least approaching the maximum size as limited by the hole through which it is admitted into the conduit, said flow sensor being free of significant flow-straightening means endwise of the rotors.

8. Flow-sensing means including a probe comprising a rotor having blades of high resistivity compared to the resistivity of the fluid whose flow is to be sensed, two elongated parallel metal members carrying bearings for said rotor, at least one insulating end support united to an end of each of said metal members, a rotation-sensing electrode carried by said end support adjacent the paths of the blades of said rotor, the blades of the rotor being arranged to effect predominating electric coupling between said sensing electrode and alternate ones of said metal members, and external electrical connection means extending to said elongated metal members and said sensing electrode.

9. Flow-sensing means as in claim 8, further including a second rotor having bearings carried by said elongated parallel metal members so that said rotors have parallel axes, a second support of insulation for the ends of said elongated metal members opposite to the ends thereof supported by said one end support, whereby said end supports and said elongated metal members constitute a frame supporting said rotors, and a second rotation-sensing electrode carried by said second support adjacent the paths of the blades of said second rotor, and an external electrical connection extending to said second rotation-sensing second electrode.

10. Flow-sensing means as in claim 9, including alternating excitation means having opposite-phase connections to said elongated metal members and a detector connected to each of said rotation sensing electrodes.

11. Flow-sensing apparatus, including a conduit, a probe having an elongated support and a means for mounting the probe on the wall of the conduit with the elongated support extending transverse to the flow of fluid therein, said probe comprising plural multiple-blade turbine-type rotors concurrently exposed to the flow of fluid and mounted on the support for independent flow-responsive rotation about parallel axes transverse to the length of the support and adapted to be disposed along the flow path and spaced apart along the support, said rotors being admissible into the conduit through a hole in the wall thereof, the hole being sealed by a portion of said mounting means, each said rotor including the blades thereof at least approaching the maximum size admissible into the conduit through said hole, said flow-sensing apparatus being free of significant flow straightening means endwise of the rotors, rotation sensing means for said rotors, respectively, and means for combining the outputs of said sensing means as a representation of the flow in the conduit.

12. A flow sensor, including a cylindrical conduit, plural independently rotatable multiple-blade rotors mounted in the conduit for rotation about axes parallel to each other and to the axis of the conduit, at least a pair of said rotors being arranged for concurrent flow-activated rotation in mutually opposite directions, a sensor adjacent each of said rotors, respectively, for providing output signals representing rotor rotation, and means for deriving from said sensors a combined representation of the flow.

13. A flow sensor as in claim 12, further including an elongated support extending transversely in said conduit, said pair of rotors being mounted on said common support.

14. A flow sensor as in claim 13 wherein the axes of said pair of rotors are displaced equally from the conduit axis.

15. A flow sensor as in claim 12 wherein said plural rotors are installed at least at two locations mutually displaced along the flow path.

16. A flow sensor as in claim 12 wherein the axes of said pair rotors are displaced equally from the conduit axis.

17. A flow sensor as in any of claims 12–16 wherein the rotors of said pair of rotors are dimensioned alike except that the blades thereof slope oppositely in relation to the flow path for causing the aforesaid rotation of the rotors in mutually opposite directions.

18. A flow sensor as in any of claims 12–16 wherein said rotors have mounting means, wherein said conduit has at least one hole for entry of the rotors and their mounting means into the conduit, and wherein each of said multiple-blade rotors including the blades thereof at least approaches the maximum size admissible through the hole at which it enters the conduit.

* * * * *